Patented Oct. 24, 1944

2,361,302

UNITED STATES PATENT OFFICE 2,361,302

ADHESIVE COMPOSITION

Julius G. Little, Wilmington, Del., assignor to Hercules Powder Company, Wilmington, Del., a corporation of Delaware No Drawing. Application December 28, 1940, Serial No. 372,175

13 Claims. (Cl. 106—144)

This invention relates to adhesive compositions and more particularly to adhesive compositions containing water-soluble film-forming materials.

Water-soluble film-forming materials such as starch, sugars, protein materials as casein, animal glue, gelatin, etc., have found rather wide use in adhesive applications. When such film-forming materials are used alone they generally provide films which are not sufficiently flexible for many uses, are too water sensitive, and are lacking in sufficient adhesive characteristics for providing satisfactory adhesion to non-porous surfaces. In order to improve the flexibility characteristics of such film formers it has been customary to include hygroscopic plasticizing agents such as glycerin, aliphatic alcohols, sugar alcohols, sulfonated oils, alkylolamines and the like. Such plasticizers when incorporated with the film-forming material absorb water and the absorbed water serves as a plasticizing agent for the film-forming material. Such plasticizers improve the properties of the films in certain respects but are undesirable from several important standpoints. They do not contribute to the adhesive characteristics of the film-forming ingredient and generally increase the water-sensitivity of the adhesive composition. They diminish the internal adhesive strength of the film-forming ingredient, thereby providing a decreased binding action in the adhesive composition.

It is an object of this invention to provide improved plasticized adhesive compositions containing water-soluble film-forming materials as adhesive components. It is a further object to provide improved plasticizers for water-soluble film-forming materials which overcome the above disadvantages of the plasticizers which have been used heretofore. It is another object to provide an improved coating material and coated articles having a water-soluble film-forming material as an essential component. Other objects of the invention will appear hereinafter.

The above objects may be accomplished in accordance with this invention by use of a liquid monohydric alcohol ester of a rosin as a plasticizer for water-soluble film-forming materials. It has been found that such rosin esters provide a unique plasticizing action on water-soluble film-forming agents and that their use with such agents greatly improves the characteristics of the water-soluble film-forming materials when used in adhesives, in binding agents, and in coating compositions in general. Such monohydric alcohol esters of rosins effectively plasticize the film-forming material by a different mechanism from the presently used plasticizers and do not exert their plasticizing capacity through absorption of water. Being non-hygroscopic in nature, they do not produce water-sensitive films. They appear to soften and flexibilize the water-soluble film-forming material through a unique action on the film-forming material. They improve the internal adhesive strength of the film-forming ingredient although they do not appear to produce films which are tacky on the surface. They serve to decrease the water-sensitivity of the adhesive and to greatly increase the effective usefulness of such film-forming materials.

The water-soluble film-forming materials which are so effectively plasticized by the improved plasticizers used in accordance with this invention comprise the general class of materials used in the trade as the base of water-soluble adhesive compositions and include such materials as gelatinized starches, sugars, protein materials as casein, soy bean flour, animal glue, gelatin and the like.

The liquid monohydric alcohol esters of rosins which have been found to possess the desirable plasticizing action utilized in this invention include the various lower monohydric alcohol esters of rosin acids or rosins such as, for example, wood rosin, gum rosin, hydrogenated forms thereof, polymerized forms thereof, heat treated forms thereof as well as the acids contained therein such as abietic acid, pimaric acid, sapinic acid, dihydroabietic acid, tetrahydroabietic acid, etc. The esters may be prepared with use of alcohols such as methyl, ethyl, propyl, isopropyl, butyl, isobutyl, amyl, isoamyl, hexyl, as well as other monohydric alcohols which yield liquid esters of the various rosins and rosin acids. The esters may be hydrogenated to reduce their unsaturation, or the esterification may be carried out with use of hydrogenated forms of the rosins.

The amount of the liquid monohydric alcohol ester of a rosin which it will be desirable to incorporate with the water-soluble film-forming ingredient in the adhesive composition will depend on the particular ester and the particular water-soluble film-forming component of the adhesive used. With use of starch, for example, an amount up to about 40% by weight of the rosin ester based on the weight of the starch will provide the above mentioned improved properties in the adhesive. With protein materials such as casein, an amount of the liquid monohydric alcohol ester up to about 30% by weight of the casein will provide the desired improvement. In general the amount of monohydric alcohol ester of a rosin incorporated with the water-soluble film-forming component will fall within the range of about 2% to about 60% by weight of the water-soluble film-forming material and preferably the amount used will fall within the range of about 5% to about 40% of the weight of the water-soluble film-forming ingredient.

The liquid monohydric alcohol ester of a rosin may be incorporated with the water-soluble film-forming material in an aqueous medium by any suitable procedure such as by dispersing the rosin ester in this medium or by blending an aqueous dispersion of the rosin ester with an aqeous dispersion of the film-forming material, or by adding the rosin ester to an aqueous solution of the water-soluble film-forming material and emulsifying the mixture by means of the emulsifying action of the dissolved film-forming material. The liquid rosin ester may be dispersed in water with or without the inclusion of an organic solvent by means of alkali or a suitable emulsifying agent. Emulsifying agents such as for example, the alkali metal salts of the higher aliphatic half ester sulfates, as sodium lauryl sulfate, sodium stearyl sulfate, sulfonated oils as sulfonated castor oil, sulfonated olive oil, soaps as sodium stearate, sodium oleate, potassium oleate, alkali metal salts of sulfonic acids, as sodium butyl naphthalene sulfonate, sodium isopropyl naphthalene sulfonate, etc. may be employed.

By use of the liquid monohydric alcohol esters of rosins as plasticizers for water-soluble film-forming materials, it is now possible to provide adhesive compositions having a variety of applications which exhibit a marked improvement in the use of the film-forming materials alone or with plasticizers such as have been used in the past. Thus the improved plasticizing action of the liquid monohydric alcohol ester of rosins may be utilized in the production of pigmented coating compositions useful in the printing and coating of paper, textile fabrics, leather, etc., where the plasticized composition provides improved binding action on the pigments. Thus the improved plasticizers may be utilized in the production of cold water paints with proteins, such as casein, as a base, where their binding action provides improved results in the coating of structural materials such as wallboards of either cellulose or mineral origin, plastered surfaces, cemented surfaces, wood, etc. Also in the production of laminated articles with use of starch as the adhesive, such as in the manufacture of paper cartons, the liquid monohydric alcohol esters of rosins provide greater adhesiveness with decreased water-sensitivity. The improved plasticizers when used with animal glue, for example, provide improved binding action on abrasive materials such as silica, silicon carbide, metal dust, etc. in the production of abrasive papers of reduced water sensitivity. In general, the adhesive, binding and coating compositions including the water-soluble film-forming materials plasticized in accordance with this invention will be found to exhibit considerable improvement over the film-forming materials alone or plasticized with the hygroscopic plasticizers which have been used in the past in any other applications in which the adhesive qualities of the water-soluble film-forming materials are utilized.

As indicated above the adhesive compositions described in accordance with this invention may contain coloring matters such as pigments, mineral fillers such as coating clays or titanium dioxide pigments as well as other materials normally used with water-soluble film-forming adhesive compositions.

As illustrative of the improvement in adhesive compositions provided by this invention, the following examples may be cited. In the examples all proportions are by weight unless otherwise indicated.

*Example I*

A casein solution was prepared by warming a mixture of 50 parts of casein with 250 parts of water at about 50° C. for 15 minutes and then adding 7 parts of sodium carbonate. After stirring, a homogeneous solution of the casein resulted. To 27 parts of this casein solution 1 part of hydrogenated methyl abietate was added with stirring, forming an emulsion. A coating composition was then prepared by mixing 5 parts of a 50% paste of coating clay in water with 1 part of the plasticized casein composition. The pigment solution was then coated on unsized paper and the coated paper dried for 24 hours. The coated paper obtained exhibited much greater flexibility than a comparable paper coated with a similar casein composition without the hydrogenated methyl abietate plasticizer.

*Example II*

A plasticized starch composition was prepared by cooking 26 parts of No. 144 cornstarch with 480 parts of water to a temperature of 80° C. until the starch was completely gelatinized. Five parts of hydrogenated methyl abietate were then added with stirring, forming a homogeneous emulsion. The above composition was applied to 80 x 80 print cloth and the impregnated cloth dried over cans at a temperature of 250° F., providing a finish on the fabric which was softer than obtainable with a comparable unplasticized starch composition.

*Example III*

A casein solution was prepared by warming 50 parts of casein with 250 parts of water at a temperature of about 50° C. for about 15 minutes and then adding 7 parts of sodium carbonate with stirring, thereby producing a homogeneous solution of casein. Three parts of methyl abietate were then added to 27 parts of this casein solution with stirring, forming a homogeneous emulsion. The plasticized casein composition was then pigmented by adding 48 parts of a 50% water paste of a titanium dioxide pigment suspended in 15 parts of additional water and agitating the pigment mixture vigorously to obtain a homogeneous dispersion. The pigment composition obtained was then applied to a cellulosic wallboard ("Cellotex") and also to an asbestos cement wallboard ("Transite"). After drying of the coated surface it was found that the plasticized casein composition bonded the pigment to the surface of the wallboard very effectively. The coated surface was resistant to chipping and to rupturing of the film and the film was quite flexible as compared with films obtained with unplasticized casein. The wallboard coated in the above manner was sprayed with an aqueous solution of formaldehyde, dried for 2 minutes at 120° F., after which it was found to be effectively waterproofed.

The use of liquid monohydric alcohol esters of rosins such as defined above as plasticizers for water-soluble film-forming materials to provide compositions which are useful in various adhesive and coating compositions presents several important advantages in the use of such film-forming materials. Thus, in addition to plasticizing the water-soluble film-forming material, the liquid monohydric alcohol esters of rosins diminish their water sensitivity, increase their adhesive qualities, and improve their wetting properties. Thus, the liquid monohydric alcohol esters of resins provide a distinct improvement over the hygroscopic plasticizers which have been used heretofore and make it possible to provide adhesive and coating compositions based on water-soluble film-forming materials which exhibit many improved characteristics.

It will be understood that the details and specific examples hereinbefore set forth are illustrative only and that the invention as broadly described and claimed is in no way limited thereby.

What I claim and desire to protect by Letters Patent is:

1. An adhesive composition comprising an aqueous medium, a film-forming material selected from the group consisting of water-soluble film-forming materials and protein film-forming materials capable of being solubilized in aqueous media as the sole film-forming material and a normally liquid monohydric aliphatic alcohol ester of a rosin as a plasticizing agent.

2. An adhesive composition comprising an aqueous alkaline medium, casein and a normally liquid monohydric aliphatic alcohol ester of a rosin as a plasticizing agent.

3. An adhesive composition comprising an aqueous medium, a film-forming material selected from the group consisting of water-soluble film-forming materials and protein film-forming materials capable of being solubilized in aqueous media as the sole film-forming material and a methyl ester of a rosin as a plasticizing agent.

4. An adhesive composition comprising an aqueous medium, a film-forming material selected from the group consisting of water-soluble film-forming materials and protein film-forming materials capable of being solubilized in aqueous media as the sole film-forming material and a normally liquid monohydric aliphatic alcohol ester of a hydrogenated rosin as a plasticizing agent.

5. An adhesive composition comprising an aqueous alkaline medium, casein and a normally liquid monohydric aliphatic alcohol ester of a hydrogenated rosin as a plasticizing agent.

6. An adhesive composition comprising an aqueous alkaline medium, casein and a methyl ester of hydrogenated rosin as a plasticizing agent.

7. An adhesive composition comprising an aqueous medium, gelatinized starch and a normally liquid monohydric aliphatic alcohol ester of a rosin as a plasticizing agent.

8. An adhesive composition comprising an aqueous medium, gelatinized starch and a methyl ester of a rosin as a plasticizing agent.

9. An adhesive composition comprising an aqueous medium, a film-forming material selected from the group consisting of water-soluble film-forming materials and protein film-forming materials capable of being solubilized in aqueous media as the sole film-forming material and from about 2% to about 60% its weight of a normally liquid monohydric aliphatic alcohol ester of a rosin as a plasticizing agent.

10. An adhesive composition comprising an aqueous alkaline medium, casein and from about 5% to about 40% its weight of a normally liquid monohydric aliphatic alcohol ester of a rosin as a plasticizing agent.

11. A coated article having a coating comprising a pigment, a film-forming material selected from the group consisting of water-soluble film-forming materials and protein film-forming materials capable of being solubilized in aqueous media as the sole film-forming material and a normally liquid monohydric aliphatic alcohol ester of a rosin as a plasticizing agent.

12. A textile fabric sized with a composition comprising an aqueous medium, a film-forming material selected from the group consisting of water-soluble film-forming materials and protein film-forming materials capable of being solubilized in aqueous media as the sole film-forming material and a normally liquid monohydric aliphatic alcohol ester of a rosin as a plasticizing agent.

13. A laminated article comprising one surface adhered to another by an adhesive composition comprising an aqueous medium, a film-forming material selected from the group consisting of water-soluble film-forming materials and protein film-forming materials capable of being solubilized in aqueous media as the sole film-forming material and a normally liquid monohydric aliphatic alcohol ester of a rosin as a plasticizing agent.

JULIUS G. LITTLE.